United States Patent [19]

Kishel

[11] Patent Number: 4,788,867

[45] Date of Patent: Dec. 6, 1988

[54] DIFFERENTIAL PRESSURE DETECTOR

[75] Inventor: Joseph F. Kishel, Clarks Summit, Pa.

[73] Assignee: Fairchild Weston Systems, Inc., Syosset, N.Y.

[21] Appl. No.: 947,640

[22] Filed: Dec. 30, 1986

[51] Int. Cl.$^4$ .............................. G01L 7/08; G01L 9/10
[52] U.S. Cl. ........................................ 73/722; 73/706; 73/708; 336/30
[58] Field of Search ................. 73/722, 708, 702, 19, 73/729, 706; 336/30

[56] References Cited

U.S. PATENT DOCUMENTS

| | | | |
|---|---|---|---|
| 2,627,750 | 2/1953 | Titus | 73/729 |
| 3,277,719 | 10/1966 | Prell | 73/722 |
| 3,296,868 | 1/1967 | Koppel et al. | 73/722 |
| 3,492,872 | 2/1970 | Caspar et al. | 73/722 |
| 3,747,042 | 7/1973 | Sheldon | 73/722 |
| 3,895,524 | 7/1975 | Jurovsky | 73/716 |
| 3,967,504 | 7/1976 | Akeley | 73/722 |
| 4,015,477 | 4/1977 | Sitkewich | 73/722 |
| 4,218,925 | 8/1980 | Didomizio, Jr. | 73/716 |
| 4,244,229 | 1/1981 | Pullen | 73/722 |
| 4,543,832 | 10/1985 | Van Over | 73/720 |
| 4,563,901 | 1/1986 | Singh | 73/706 |
| 4,665,753 | 5/1987 | Bertrand | 73/706 |

OTHER PUBLICATIONS

FERROFLUIDS: Physical Properties and Applications, Ferrofluidics Corporation, Nashua, NH.

Primary Examiner—Donald O. Woodiel
Attorney, Agent, or Firm—Sanford J. Asman

[57] ABSTRACT

A liquid filled differential pressure detector comprises two pressure sensors. Each sensor is constructed of one or more capsules, which are pairs of diaphragms sealed at their peripheries. The innermost diaphragms are interconnected by a tube which contains a rod assembly. The interior of the sensors and interconnection tube form a sealed volume filled with a incompressible liquid. The rod assembly contacts the outermost diaphragm of the sensors and is displaced by expansion and contraction of the capsules caused by a differential pressure change against the outer surface of the sensors. The motion of the rod assembly is transformed into an electrical signal to indicate the pressure measurement. The apparatus is symmetrical about the center point of the tube to reduce error caused by the fluid's thermal expansion by causing equal and opposite forces to cancel, thereby preventing motion of the rod assembly. An overpressure condition results with one sensor completely collapsing with one diaphragm bottoming out against the other, but causes no damage to the capsules due to complementary facing of the diaphragm pairs. The compliance of the diaphragms is chosen to be small enough to cause any gaseous bubbles to be driven into solution during the initial prepressurization of the fluid, ensuring its incompressibility. In a second embodiment, the rod assembly is replaced with a core assembly located at the midpoint of the tube, suspended in a magnetic fluid which separates the incompressible fluid into two identical volumes. The motion of the core assembly, which is due purely to the displacement of the incompressible fluid, is transformed into an electrical signal to indicate a pressure measurement.

19 Claims, 3 Drawing Sheets

DIFFERENTIAL PRESSURE DETECTOR

BACKGROUND OF THE INVENTION

1. Field of the Invention

This invention relates generally to pressure measurement devices. More specifically, it relates to devices which measure the difference in pressure between two regions in demanding applications such as in the cooling loops of nuclear reactors.

2. Related Art

There are many industrial applications where pressure, or differences in pressure, need to be measured. For example, in pipelines containing an internal narrowing aperture, or orifice plate, the pressure on the upstream side of the orifice plate will be greater than the pressure on the downstream side of the orifice plate. The difference in pressure between these two regions is directly related to the speed of fluid traveling in the pipeline. Therefore, in applications where the rate of fluid flow needs to be accurately and reliably measured, the pressure-sensing device which indirectly indicates this fluid velocity needs to be commensurately accurate and reliable.

In particularly demanding applications, the pressure measurement device must be able to withstand very high pressures. These pressures may also be applied very suddenly, as when a wave front hits the upstream side of the pressure detector. Of course, it is important that the pressure detector not sustain any damage during the occurrence of these pressures. But also, it is imperative that the sensitivity, accuracy, and continued functioning of the pressure detector over a wide pressure range is not compromised by these occurrences.

Certain known high-pressure protection arrangements comprise valves which close completely at a predetermined pressure threshold to prevent any further pressure increases from damaging the device's pressure-sensitive elements. One particular known system has the valves disposed internally, to isolate incompressible fluid within a pressure-sensitive element so that it is not compressed further by any additional pressure increases. Whereas this protective valve arrangement does prevent damage to the pressure-sensitive elements, the valves sometimes may not reopen when the excessive pressure is removed, resulting in a "lockup" of the device and a subsequent total loss of pressure measurement capability.

Also, it is important in many demanding applications, such as in the cooling loops of nuclear reactors, that the sensitivity and accuracy be maintained over a wide temperature range. Known systems whose pressure measurements depend on displacement of an internal fluid often have the characteristic that the pressure measurement "wanders" as the temperature rises due to thermal expansion of the internal fluid, even though the actual pressure remains stable.

Known pressure measurement devices which depend on incompressibility of the fluid contained within them often suffer from the effects of unwanted gaseous bubbles contained within the fluid. The pressure of these bubbles compromises the effective incompressibility of the fluid, thereby decreasing accuracy and reliability of pressure measurement.

Finally, as in any commercial setting, many known systems do not achieve their objectives economically. Their manufacture, assembly, installation, operation, and/or maintenance may be too expensive to be cost-justified.

SUMMARY OF THE INVENTION

It is a purpose of this invention to provide a differential pressure detector which can withstand extremely high pressures without sustaining any permanent damage.

It is another purpose of this invention to provide a differential pressure detector which maintains sensitivity and accuracy of differential pressure measurement over a wide temperature and/or pressure range.

It is another purpose of this invention to provide a differential pressure detector wherein consistency of measurement is achieved through use of a fluid whose incompressibility is preserved.

It is still another purpose of this invention to provide a differential pressure detector whose assembly, installation operation, and maintenance is simple, and whose manufacture is inexpensive.

These goals are achieved in the differential pressure detector according to the present invention. The invention comprises first and second identical pressure sensors which are connected by a hollow tube. Depending on which embodiment of the invention is chosen, an incompressible fluid occupies either one, or two, continuous sealed volumes which are defined by the sensors and the tube. In the single-volume embodiment, a rod assembly extends from one sensor to the other within the tube. In the two-volume embodiment, a core assembly comprising a permanent magnet and two end caps buoyantly levitates within the tube, separating the two sealed volumes. A position measuring device continuously monitors the location of the rod assembly or core assembly within the tube.

When the pressure against the outside of one sensor increases with respect to the pressure outside the second sensor, the first sensor contracts and forces some of the incompressible fluid toward the second sensor in the tube, forcing the second sensor to expand. The contraction of the first sensor cause the rod assembly or core assembly to be displaced toward the second sensor. This displacement is detected by the position measuring device, which communicates the displacement information to an external indicator or control device. This displacement information is a function of the pressure difference between the pressure applied to the first sensor and the pressure applied to the second sensor.

When the pressure external to one sensor becomes so great that the sensor becomes completely collapsed, the sensor sustains no damage in this invention because the internal faces of the sensor which are forced into contact are perfectly complementary in contour. Pressures even hundreds or thousands of times great enough to cause the initial collapse can be safely endured. And when the pressure is relieved, the sensors expand again to allow the device to regain its pressure measurement capability.

The invention is symmetrical about the center point of the tube so that in environments of extreme temperatures or temperature changes, any thermal expansion of the incompressible fluid in the tube and sensors causes both sensors to expand equal amounts. This balanced expansion prevents any motion of the rod assembly or core assembly, thereby avoiding any spurious changes in the pressure measurement.

In this invention, the compliance of the sensor material is chosen to be small enough that, to expand the sensors the proper amount, the incompressible fluid must be prepressurized to a degree which forces any gaseous bubbles into solution. This prepressurization guarantees the continued incompressibility of the sealed volume during operation. This continued incompressibility in turn preserves consistency of measurement, especially at times of rapidly changing external pressure.

Finally, the operational portions of this invention are radially symmetric, which allows them to be easily turned during manufacturing. This symmetry, coupled with the structural simplicity of the invention, ensures that its manufacture, assembly, installation and maintenance are easy and inexpensive.

BRIEF DESCRIPTION OF THE DRAWINGS

The following detailed description is best understood with reference to the accompanying drawings, in which.

DETAILED DESCRIPTION OF THE PREFERRED EMBODIMENTS

Figure 1:
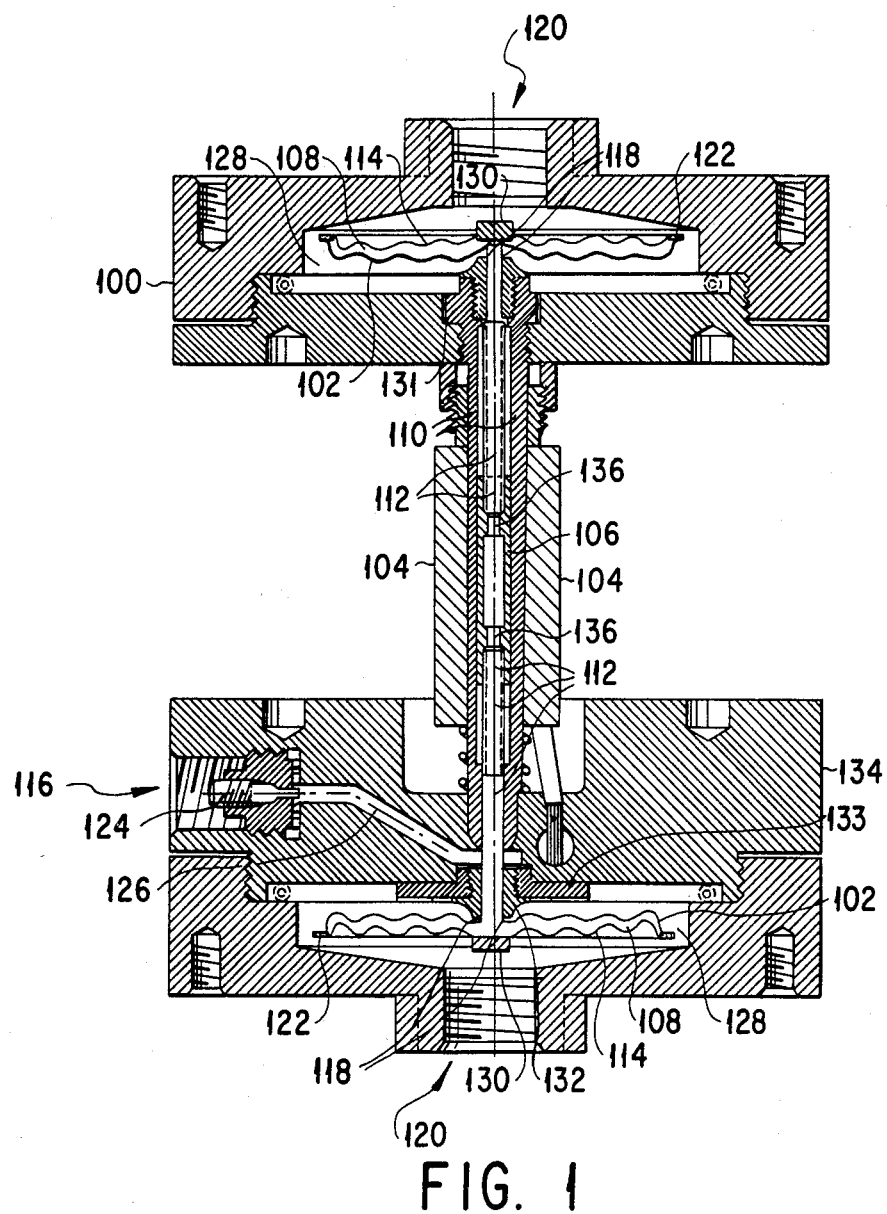
FIG. 1 is a top plan view in cross section of an embodiment of a differential pressure detector according to the present invention.

Referring to FIG. 1, the single-volume embodiment of the differential pressure detector according to the present invention comprises two pressure sensors. Each sensor in this embodiment is formed by sealing together inner and outer diaphragms 102 and 114 at their peripheries 122 so as to enclose a volume. A button 130 of strengthening material is attached to the center of the exterior of outer diaphragm 114. These diaphragms are formed at the same time in the same die and may be either corrugated or flat. Both diaphragms, although composed of metal in the preferred embodiment, are sufficiently flexible to allow expansion or contraction of the capsule cavity when different pressures are applied to the exterior of the capsule.

The two capsules may be disposed, for example, on opposite sides of a barrier, or on opposite sides of an orifice plate inside a pipeline. The gases or liquids whose differential pressure are to be measured enter pressure chambers 128 within housings 100 and 134 via inlet apertures 120 to surround capsule 102/114.

The inner diaphragms 102 are connected around backflow aperture 118 to respective fittings 131 and 132. In the particular embodiment shown in FIG. 1, fittings 131 and 132 are sealably threaded into hollow cylindrical tube 110 and a rigid plate 133, respectively. Contained in this hollow tube 110 is a rod assembly comprising two rods 112 which partially fill the backflow aperture 118 and which contact the outer diaphragms 114. As used in this specification, the term "rod assembly" denotes the two rods 112 and a soft iron core 106 which joins them. The rods may be solid, but are preferably hollow with side apertures (302 in FIG. 3) to facilitate the flow of fluid not only around the rods, but through an interior channel 304, from one sensor to another. The interior of the tube 110 and both sensors are sealed and filled with an incompressible fluid 108 such as water.

Constituting the center of the rod assembly is a soft iron core 106 which forms the core of a linear variable differential transformer (LVDT). Optionally, springs may be interposed at 136 between core 106 and the two rods 112 to press the rods' ends against outer diaphragms 114. Coils 104 of the linear variable differential transformer are placed around the middle of the exterior of the tube 110, and lead to an indicator or control device. A particular example of an LVDT is part number 110 HR-10 of Schaevitz Engineering Company (Pennsaucken, N.J.), but any suitable LVDT may be used.

A fluid injection port 116 is provided for the pre-operational injection of the incompressible fluid along injection canal 126 to the sealed volume defined by capsules 102/114 and tube 110. After injection, the injection canal 126 is sealed by, for example, a screw 124. Fluid injection port 116 is adapted for the attachment of a vacuum pump for removing air from the sealed volume prior to injecting the incompressible fluid.

Figure 2:
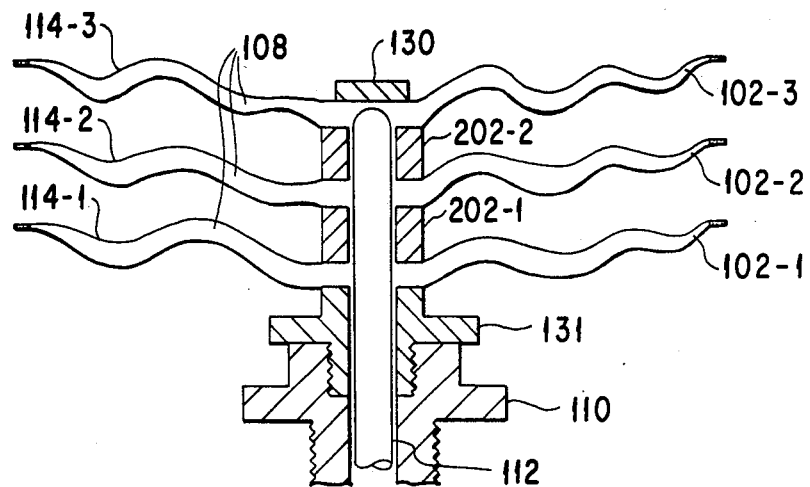
FIG. 2 illustrates in partial cross section a plural-capsule embodiment of a pressure sensor, comprising plural diaphragm pairs used in the present invention.

FIG. 2 illustrates a plural-capsule embodiment of a pressure sensor according to the present invention. A plurality of capsules (for example, three) comprise the sensor. While three capsules are represented in FIG. 2, it should be understood that this embodiment embraces pressure sensors comprising two or more capsules. The capsules are separated by spacers 202-1 and 202-2. Each diaphragm pair is constructed essentially the same as the diaphragm pair in the FIG. 1 embodiment, and are formed of inner diaphragms 102-1, 102-2, 102-3, with respective outer diaphragms 114-1, 114-2, and 114-3.

The interiors of the diaphragm pairs are connected as if by an extension of tube 110. Tube 110 itself actually ends at its connection to fitting 131 at one end, and at housing 134 at the other end. The inner diaphragm 102-1 closest to the soft iron core is called the "innermost" diaphragm. The rod 112 extends through the center of all diaphragm pairs and is pressed firmly against the outer diaphragm 114-3 of the diaphragm pair which is most distantly located from the soft iron core. This outer diaphragm 114-3 is called the "outermost" diaphragm.

The use of plural diaphragm pairs increases not only the sensitivity of measurement but also the range of measurable differential pressures. The structure and operation of the plural-capsule embodiment is conceptually identical to the operation of the single-capsule embodiment. Thus, the two embodiments will not hereafter be separately described.

Figure 6:
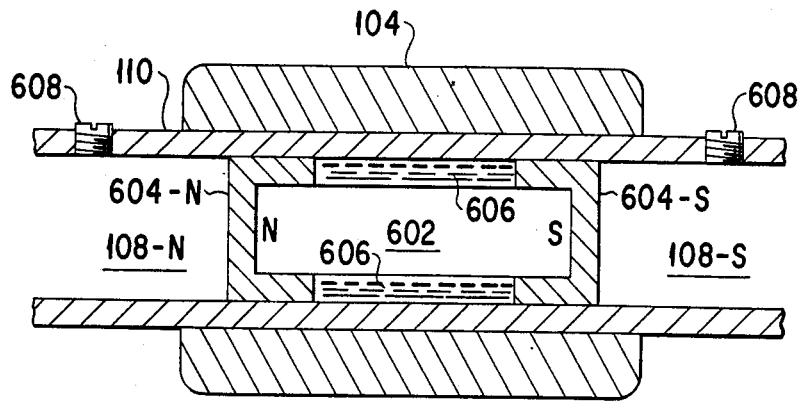
FIG. 6 illustrates in partial cross section a core assembly used in another embodiment of a differential pressure detector according to the present invention.

FIG. 6 illustrates the two-volume embodiment of the present invention, wherein the rod assembly 112/106 (G. 1) is replaced by a core assembly 602/604. A core assembly comprises a cylindrical permanent magnet 602 which is permanently attached to two soft iron end caps 604-N and 604-S. A magnetic fluid, or "ferrofluid", 606 surrounds the permanent magnet 602 as well as filling in the gap between the soft iron end caps 604 and the tube 110.

Two "backfill" (incompressible fluid) adjustment ports 608 are illustrated graphically as being disposed in the tube 110 on opposite sides of the core assembly 602/604. These backfill adjustment ports replace the single fluid injection port 116 (FIG. 1). The backfill adjustment ports 608 need not be located in the tube 110 exactly as illustrated, but may be disposed at any point where incompressible fluids may be injected into identical but separate volumes 108-N and 108-S. The boundary between sealed volumes 108-N and 108-S is defined by the magnetic fluid 606 which surrounds the core assembly 602/604. The magnetic fluid 606 and the incompressible fluid 108 are immiscible, to ensure separation of the two volumes 108-N and 108-S.

The magnetic fluid, or ferrofluid, 606 may be any appropriately chosen known magnetic fluid. Generally, magnetic fluids have three components: a carrier (or solvent), magnetic particles in suspension, and a stabilizer. In the present invention, the fluid carrier is advantageously chosen to be a diester, and the magnetic particles in suspension in the carrier may be chosen to be, for example, magnetite ($Fe_3O_4$). As is known in the art, a stabilizer is used to ensure that the particles suspended in the carrier do not agglomerate into particles larger than about 100 Angstroms. This stabilizer ensures that the particles may be kept in suspension merely by Brownian motion. Whereas the above particular ferrofluid composition is advantageously employed in a preferred embodiment of the present invention, any ferrofluid 606 which surrounds the core assembly 602/604 and reliably separates the incompressible fluid into two separate volumes 108-25 and 108-5 may be employed. Reference is made to the brochure "FERROFLUIDS: Physical Properties and Applications" available from Ferrofluidics Corporation of Nashua, N.H., for a more detailed exposition of ferrofluid technology.

The operation of the present invention device will now be described.

When a greater pressure is applied to the exterior of one sensor than to the other, the sensor experiencing the higher pressure will contract. This contraction displaces a quantity of incompressible fluid into tube 110 toward the other of said sensors. The opposite sensor will expand due to the force exerted on its interior by the displaced volume of incompressible fluid.

Referring to the embodiment illustrated in FIG. 1, this respective contraction and expansion of the two sensors displaces the rod assembly 112/106. The movement of the rod assembly's soft iron core 106 relative to the coils 104 due to the change in differential pressure applied to the sensors changes the electrical characteristics of the LVDT. This change in characteristics of the LVDT indicates the change in differential pressure to a display or control device (not shown).

The embodiment illustrated in FIG. 6 differs from that of FIG. 1 in its substitution of a core assembly 602/604 for the rod assembly 112/106. The soft iron end caps 604-N and 604-S serve the same function as the soft iron core 106 (FIG. 1). Namely, they determine the electrical characteristics of the LVDT coils 104. However, they additionally perform the function of directing the magnetic flux emanating from permanent magnet 602 so as to hold magnetic fluid 606 in place about the core assembly.

Magnetic fluid 606 performs two functions.

First, since it is held in place around the core assembly 602/604, it keeps the core assembly buoyant within tube 110. Since it is buoyant, there is essentially no friction between the core assembly 602/604 and the tube 110 when the pressure differential between the two sensors changes and causes the core assembly 602/604 to move. This lack of friction between the soft iron end caps 604 and the tube 110 results in increased consistency and accuracy of measurement, especially in dynamic pressure environments. Also, the critical need for accurate fitting and alignment of a rod assembly within a tube (112/106 and 110 in FIG. 1) is avoided.

Second, the magnetic fluid 606 performs the function of sealing off the two volumes of incompressible fluid 108-N and 108-S into two identical volumes. Just as in the embodiment of FIG. 1, when a greater pressure is applied to the exterior of one sensor than to the other, the sensor experiencing the higher pressure will contract. This contraction displaces a quantity of incompressible fluid into tube 110 toward the core assembly 602/604, displacing it. The sensor experiencing the smaller pressure will expand due to the force exerted on its interior by the pressure communicated to its interior through the displaced core assembly.

However, compared with the rod assembly in the embodiment of FIG. 1, the distance by which the FIG. 6 core assembly is displaced is greatly magnified by what is termed the "hydraulic lever" effect. Since the core assembly of FIG. 6, unlike the rod assembly of FIG. 1, is not attached to the sensors, it is left floating free to be displaced by a distance determined solely by the amount of fluid displaced from the higher-pressure sensor. For a given amount of contraction in a sensor, a given amount of incompressible fluid 108 is forced into tube 110. Since essentially the entire diaphragm 114 is pressed toward diaphragm 102, a volume of incompressible fluid 108 corresponding to the relatively large area of the diaphragms 114 and 102 is forced through relatively small backflow aperture 118. Backflow aperture 118 therefore passes a large volume of fluid into tube 110 so as to displace core assembly 602/604.

In contrast to the embodiment of FIG. 6, in the embodiment of FIG. 1, since the rod assembly 112/106 is attached to the sensors, the rod assembly is displaced by an amount exactly equalling the amount of contraction experienced by the higher-pressure sensor. The "hydraulic lever" is absent.

Figure 3:
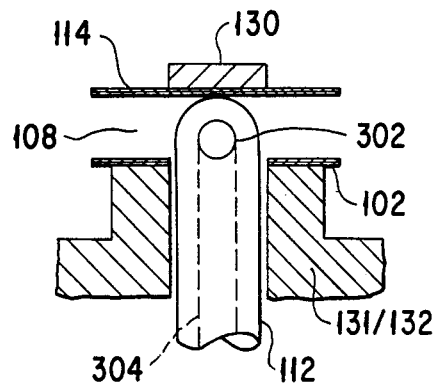
FIG. 3 illustrates in partial cross section the side apertures of a hollow embodiment of the rods used in the present invention.

Therefore, the core assembly 602/604 (FIG. 6) is displaced more than the rod assembly 112/106 (FIG. 1) by a factor approximated by $A_S/A_T$, where $A_S$ is the effective area of a cross-section of the sensor perpendicular to the tube, and $A_T$ is the area of a cross-section of the interior of the tube (that is, the area of backflow aperture 118). This greater displacement of the core assembly 602/604 causes a commensurately greater change in the characteristics of the LVDT for a given differential pressure change. The end result is greatly increased measurement sensitivity as compared with the embodiment of FIG. 1. Proportionately greater increases are achieved using the plural-capsule embodiment (FIG. 3).

Except for the material specifically directed to an embodiment comprising a rod assembly, the remainder of the discussion applies to either of the embodiments in FIGS. 1 and 6.

In the case of an overpressure condition, where one sensor's capsule(s) experience such high chamber pressure that they become completely compressed and void of any fluid, the invention does not suffer the irreparable harm which has been a problem in known devices. The overpressure condition merely causes the diaphragms 102 and 114 of the present invention to "bottom out" to their fully compressed position. This bottoming out causes no permanent harm because these diaphragms 102 and 114 were formed at the same time in the same die. Therefore, their faces mate perfectly together.

Without perfect mating, high pressure contact would deform the diaphragms and thereafter cause measurement inconsistencies both at and below the point at which overpressure is reached. A further increase in the pressure differential past the fully compressed point results in no further movement of the rod assembly 112/106 or core assembly 602/604. Therefore, no further altering of the pressure measurement occurs.

A second protective feature of the present invention for overpressure conditions is the placement of a button 130 at the center of the outermost diaphragm 114. This button 130 adds mechanical strength to this diaphragm 114 to prevent it from being bent inward into the tube 110 during overpressure conditions. Button 130 should be wider than backflow aperture 118.

With these two protections (mated diaphragm faces, and buttons), the device according to the present invention can withstand differential pressures thousands of times greater than the minimum pressure needed to barely cause an overpressure condition. Also, the natural damping effect of prepressurized, incompressible fluid 108 during extremely rapid pressure changes helps to prevent damage as it prevents the diaphragms from being slammed together. The fluid also helps to prevent spurious measurement oscillations immediately following pressure changes.

The initial pressurization of the incompressible fluid 108 is sufficient to expand the sensors to slightly less than ½ the maximum diaphragm separation. This is necessary to allow for the diaphragms to further separate to accommodate thermal expansion of the backfill fluid 108, as well as the complete collapse of an opposite sensor in an overpressure condition. It should be noted that, in two-sensor pressure detectors, the combination of the two sensors will display half the compliance of known one-sensor versions.

The diaphragms in the preferred embodiment, being metallic, are "stiff." Therefore, the prepressurization of the incompressible fluid 108 which is needed to expand the capsules is sufficient to eliminate gaseous bubbles in the fluid by driving them into solution. In contrast to the present invention, a gas and liquid backfill 108 would be compressible, which would reduce the efficient transmittal of pressure from one capsule to the other during changes in chamber pressure. This inefficiency would create inconsistency and error of measurement, especially in dynamically changing pressure environments.

Figure 4:
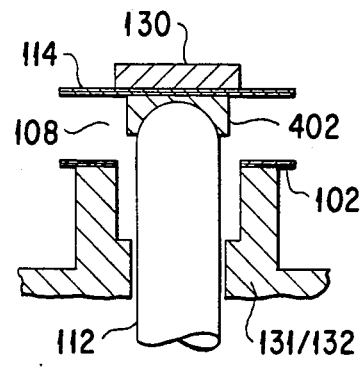
FIG. 4 illustrates in partial cross section a cup for receiving the end of a rod in another embodiment of the present invention.

The rods 112 must maintain contact with the outermost diaphragms 114 of the capsules during operation to prevent any oscillation or jiggling of the rod assembly from affecting the pressure measurement. Ends of the rods 112 may be mechanically attached to one outermost diaphragm, or, they may fit into a cup 402 (FIG. 4) without mechanical attachment. Alternatively, they may contact flat diaphragms without mechanical attachment, as follows.

In a first embodiment of a rod assembly, a telescoping rod composed of two identical subsections maintains contact with the outermost diaphragms 114 of the sensor by being pressed away from the soft iron core 106 by springs at 136 (FIG. 1).

A second, preferred embodiment of the rod assembly (not shown separately from FIG. 1) comprises a rigid rod assembly 112/106 long enough to deflect the outer diaphragms 114 of the capsule to a position slightly beyond that which would be established by the fluid 108 initial pressure alone. The inward tension caused by this deflection obviates the need to mechanically attach the rods to the outermost diaphragms. A cup is not necessary since the rods 112 fit snugly inside tube 110. In this second embodiment, two identical rods 112 are mechanically attached to opposite ends of the soft iron core 106 to form a single rigid rod assembly. For example, the rods 112 may be screwed into the core 106 from opposite directions. The sealed, constant-volume fluid causes the inner diaphragm to deflect away from the iron core slightly to match the deflection of the outermost diaphragm due to the rod assembly's length, bending the entire capsule very slightly toward a convex shape.

The preferred embodiment is optimized for damping. Rods 112 fit snugly in tube 110. If rod 112 is solid, it is difficult for incompressible fluid 108 to travel from one sensor to another inside the tube. This difficulty results in what is called the damping effect. The damping effect manifests as undesirably slow measurement response time when chamber pressures are changing rapidly. If rods 112 are hollow with side apertures (302 in FIG. 3), this damping (and slow response time) are alleviated.

However, some degree of damping may be desirable. If rods 112 have too wide an interior channel 304 connecting the side apertures 302 and/or the incompressible fluid has low viscosity, damping is virtually eliminated. Although measurement response time is fast, small variations in chamber pressure are communicated in the pressure measurement. Measurement of chamber pressure variations so small that the user desires to ignore them can be suppressed by increasing the damping effect. The damping effect is increased to the proper degree by decreasing the diameter of interior channel 304, or by choosing a more viscous incompressible fluid 108.

A major cause of measurement error in known devices is the thermal expansion of incompressible fluid 108 which can cause diaphragm motion to displace the element from which a position indication is derived. This displacement creates an erroneous change in the pressure measurement.

An important advantage of the present invention is its lack of temperature sensitivity. The symmetry of the two sensors about the center of the tube 110 prevents thermally-induced inaccuracies. To assure symmetry in the FIG. 1 embodiment, the two rods 112 must be of the same length. To assure symmetry in the FIG. 6 embodiment, the two volumes 108-N and 108-S of incompressible fluid must be of equal size. This equality of size is assured by initially filling the two volumes 108-N and 108-S with identical amounts of incompressible fluid through respective backfill adjustment ports 608. In both the embodiments of FIGS. 1 and 6, the two sensors are designed to be identical in size and shape.

Because of the device's symmetry, the two sensors expand equal amounts in opposite directions, and the thermal expansion of the incompressible fluid 108 creates no motion in the LVDT soft core 106 (FIG. 1) or soft iron end caps 604 (FIG. 6). Since these assemblies do not move, the pressure measurement does not change due to thermal expansion.

Thermal expansion will not cause the rods 112 to lose contact with the outermost diaphragms 114-3. When spring-loaded rods are employed (at 136 in FIG. 1), the springs will cause the proper contact to be maintained. And when employing a stiff rod assembly with no springs, the length of the rod assembly was defined above to deflect the outermost diaphragm slightly more than the fluid prepressurization alone would cause, with the inner diaphragms deflecting in a like direction. Therefore, during thermal expansion, the shape of the capsule may change slightly, being reduced in convexity, but rod-to-diaphragm contact is maintained.

Figure 5:
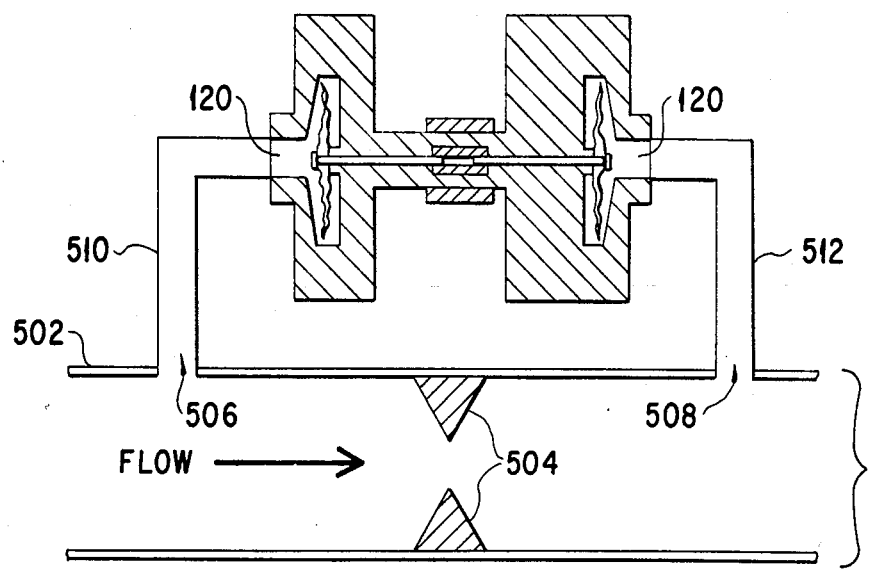
FIG. 5 illustrates in partial cross section the invention as deployed in the particular application of indirect measurement of pipeline fluid velocity by measurement of differential pressure.

FIG. 5 illustrates a deployment of the present invention in an application where the velocity of fluid flow in pipeline 502 is to be measured. An orifice plate 504 is placed between an upstream conduit aperture 506 and downstream conduit aperture 508. In accordance with well-known principles of fluid flow mechanics, pressure upstream from the orifice plate 54 will always be greater than pressure downstream from the orifice plate 504. The difference in pressure is directly related to the velocity of fluid flow. The pressures at conduit apertures 506 and 508 are communicated inside conduits 510 and 512, respectively, through inlet apertures 120 of this invention.

In the manner described regarding FIGS. 1 and 6, the present invention measures the difference between the upstream pressure and the downstream pressure. This differential pressure measurement is directly related to the fluid velocity in pipeline 504. The pressure measurement thus constitutes an indirect measurement of pipeline fluid velocity.

Of course, differences in pressure between two regions can be directly measured simply by deploying the invention so that inlet apertures 120 are on opposite sides of a barrier separating the regions.

Also, the invention can be deployed to measure gauge pressure, as opposed to differential pressure. This is accomplished by exposing a first inlet aperture to a constant pressure, such as atmospheric pressure. The second inlet aperture is exposed to the gas or liquid whose gauge pressure is to be measured. In this deployment (not shown), the only pressure which changes the invention's communicated measurement is the pressure to which the second inlet aperture is exposed.

Another advantage of this invention is its economical production. As can be seen from FIGS. 1 and 6, this invention has very few operational parts, all of which are symmetrical about a center axis. The rods 112, tube 110, diaphragms 102/114, most parts of housings 100 and 134, the permanent magnet 602 and soft iron end caps 604 are thus able to be inexpensively turned for manufacture.

Differential pressure detectors according to the present invention are specially suitable for use at various points in nuclear reactors. First, the height of water in the pressurizer associated with the primary cooling loop can be inferred by comparing the difference in pressure between the top and the bottom of the pressurizer. Also, the height of water in the steam generator, as well as the inward flow of water and the outward flow of steam from the steam generator, can be measured according to principles outlined above. Finally, the measurement of coolant flow in and out of the reactor can be similarly measured.

Although the present invention is specially suitable for use in the primary or secondary cooling loops in a pressurized water nuclear power reactor, it can be used in any application where differences in pressure between two cavities needs to be economically, reliably and accurately monitored over a wide temperature range and under conditions involving otherwise damaging pressure differences. Thus, the scope of the present invention should not be limited by any examples described above, but should be defined only in accordance with the following claims.

What is claimed is:

1. A differential pressure detector comprising:
   first and second pressure sensors, each sensor comprising an inner diaphragm and an outer diaphragm sealed together at respective diaphragm peripheries, wherein both said inner and outer diaphragms are flexible and are contemporaneously manufactured from the same die so that their mutually opposing faces mate perfectly when pressed together;
   a hollow tube connecting said two inner diaphragms;
   first and second pressure chambers which substantially surround respective said first and second sensors;
   an incompressible fluid occupying a single continuous sealed volume defined by said sensors and said tube, said fluid being pre-compressed in an initial filling to a pressure sufficient to separate said inner and outer diaphragms to slightly less than one-half a maximum diaphragm separation distance, said diaphragms having a compliance small enough so that the pressure caused in said initial filling is sufficient to drive gaseous bubbles into solution.
   a rod assembly extending within said tube between and physically contacting both said outer diaphragms, having a displacement on the difference in pressures in said first and second pressure chambers, said rod assembly having a length sufficient to deflect said outer diaphragms slightly more than a deflection that would be caused by said initial filling alone, said rod assembly being hollow and having side apertures to facilitate free flow of said fluid from one sensor to the other; and
   means for measuring the displacement of said rod assembly and communicating a resulting measurement, wherein when pressure in said first pressure chamber increases said rod assembly is displaced toward said second sensor to cause a change in said communicated measurement;
   wherein said differential pressure detector is symmetric about a midpoint of said tube so that thermal expansion of said fluid causes no displacement of said rod assembly and no change in said measurement.

2. A differential pressure detector, comprising:
   first and second pressure sensors;
   first and second pressure chambers which substantially surround respective said first and second sensors, wherein each of said first and second pressure sensors comprises one or more pairs of diaphragms, each of said pairs comprising an inner diaphragm and an outer diaphragm sealed together at respective diaphragm peripheries, wherein both said inner and outer diaphragms are flexible, and wherein liquid or gas in said pressure chambers contact both said inner and outer diaphragms;
   a hollow tube connecting said first and second pressure sensors;

an incompressible fluid occupying a single continuous sealed volume defined by said sensors and said tube;

a displaceable means extending within said tube between and physically contacting both said first and second pressure sensors, having a displacement depending on the difference in pressures in said first and second pressure chambers, wherein said displaceable means is a rod assembly having a length sufficient to deflect said outer diaphragms slightly more than a deflection that would be caused by an initial filling of said incompressible fluid, whereby contact is maintained between said rod assembly and two outermost diaphragms; and means for measuring the displacement of said displaceable means and communicating a resulting measurement.

3. A differential pressure detector according to claim 4, wherein said inner and outer diaphragms' mutually opposing faces mate perfectly when pressed together in an overpressure condition, and sustain no damage when pressed together with a pressure thousands of times greater than the pressure needed to reach said overpressure condition, thereby allowing the measurement communicated during said overpressure condition to be accurately repeatable during all occurrences of said overpressure condition.

4. A differential pressure detector according to claim 2, wherein said differential pressure detector is symmetric about a mid-point of said tube so that thermal expansion of said incompressible fluid causes no displacement of said displaceable means and no change in said communicated measurement.

5. A differential pressure detector comprising:
first and second pressure sensors;
first and second pressure chambers which substantially surround respective said first and second sensors;
a hollow tube connecting said first and second pressure sensors;
an incompressible fluid occupying a single continuous sealed volume defined by said sensors and said tube;
a displaceable means extending within said tube between and physically contacting both said first and second pressure sensors, having a displacement depending on the difference in pressures in said first and second pressure chambers; and
means for measuring the displacement of said displaceable means and communicating a resulting measurement;
wherein said first and second pressure sensors have predetermined compliances so that a prepressurization of said incompressible fluid is sufficient to drive any gaseous bubbles into solution.

6. A differential pressure detector according to claim 5, wherein said differential pressure detector is symmetric about a mid-point of said tube so that thermal expansion of said incompressible fluid causes no displacement of said displaceable means and no change in said communicated measurement.

7. A differential pressure detector comprising:
first and second pressure sensors, each sensor comprising one or more capsules, each capsule comprising flexible inner and outer diaphragms sealed together at respective diaphragm peripheries, wherein said inner and outer diaphragms are contemporaneously manufactured from the same die so that their mutually opposing faces mate perfectly when pressed together;
first and second pressure chambers which substantially surround respective said first and second pressure sensors;
a hollow tube connecting two innermost inner diaphragms;
an incompressible fluid occupying first and second separate, identical sealed volumes defined by respective said first and second pressure sensors, said tube, and a central volume of magnetic fluid, said fluid being pre-compressed in an initial filling to a pressure sufficient to separate said inner and outer diaphragms to slightly less than one-half a maximum diaphragm separation distance, said inner and outer diaphragms having a compliance small enough so that the pressure caused in said initial filling is sufficient to drive gaseous bubbles into solution;
a core assembly suspended within said tube, having a displacement depending on the difference in pressures in said first and second pressure chambers, said core assembly comprising a permanent magnet attached to two soft iron end caps; and
means for measuring the displacement of said core assembly and communicating a resulting measurement, wherein when pressure in said first pressure chamber increases said core assembly is displaced toward said second sensor by a distance greater than the amount of deflection of two outermost diaphragms to cause a change in said communicated measurement;
wherein said magnetic fluid separates said first and second identical sealed volumes and suspends said core assembly; and
wherein said differential pressure detector is symmetric about a midpoint of said tube so that thermal expansion of said fluid causes no displacement of said core assembly and no change in said measurement.

8. A differential pressure detector comprising:
first and second pressure sensors, each sensor comprising a plurality of capsules, each capsule comprising flexible inner and outer diaphragms sealed together at respective diaphragm peripheries, wherein the inner and outer diaphragms are contemporaneously manufactured from the same die so that their mutually opposing faces mate perfectly when pressed together, said capsules being separated within respective pressure sensors by spacers which contact the outer diaphragm of one capsule and the inner diaphragm of a next capsule;
first and second pressure chambers which substantially surround respective said first and second pressure sensors;
a hollow tube connecting two innermost inner diaphragms;
an incompressible fluid occupying a single continuous sealed volume defined by said sensors and said tube, said fluid being pre-compressed in an initial filling to a pressure sufficient to separate said inner and outer diaphragms to slightly less than one-half a maximum diaphragm separation distance, said diaphragms having a compliance small enough so that the pressure caused in said initial filling is sufficient to drive gaseous bubbles into solution;
a rod assembly extending within said tube between and physically contacting outermost diaphragms, having a displacement depending on the difference in pressures in said first and second pressure chambers, said rod assembly having a length sufficient to deflect said outermost diaphragms slightly more than a deflection that would be caused by said initial filling alone, said rod assembly being hollow and having side apertures to facilitate free flow of said fluid from one sensor to the other; and means for measuring the displacement of said rod assembly and communicating a resulting measurement, wherein when pressure in said first pressure chamber increases said rod assembly is displaced toward said second sensor to cause a change in said communicated measurement;

wherein said differential pressure detector is symmetric about a midpoint of said tube so that thermal expansion of said fluid causes no displacement of said rod assembly and no change in said measurement.

9. A differential pressure detector comprising:

first and second pressure sensors having predetermined compliances;

first and second pressure chambers which substantially surround respective said first and second sensors;

a hollow tube connecting said first and second pressure sensors;

an incompressible fluid occupying a single continuous sealed volume defined by said first and second pressure sensors and said tube;

a displaceable means having a displacement depending on the difference in pressures in said first and second pressure chambers; and means for measuring the displacement of said displaceable means and communicating a resulting measurement;

wherein said compliances are predetermined so that a prepressurization of said incompressible fluid is sufficient to drive any gaseous bubbles into solution.

10. A differential pressure detector according to claim 9, wherein each of said first and second pressure sensors comprises one or more pairs of diaphragms, each of said pairs comprising an inner diaphragm and an outer diaphragm sealed together at respective diaphragm peripheries, wherein both said inner and outer diaphragms are flexible, and wherein liquid or gas in said pressure chambers contact both said inner and outer diaphragms.

11. A differential pressure detector according to claim 10, wherein said inner and outer diaphragms' mutually opposing faces mate perfectly when pressed together in an overpressure condition, and sustain no damage when pressed together with a pressure thousands of times greater than the pressure needed to reach said overpressure condition, thereby allowing the measurement communicated during said overpressure condition to be accurately repeatable during all occurrences of said overpressure condition.

12. A differential pressure detector according to claim 10, wherein said displaceable means is a rod assembly having a length sufficient to deflect said outer diaphragms slightly more than a deflection that would be caused by an initial filling of said incompressible fluid, whereby contact is maintained between said rod assembly and two outermost diaphragms.

13. A differential pressure detector according to claim 9, wherein said differential pressure detector is symmetric about a mid-point of said tube so that thermal expansion of said incompressible fluid causes no displacement of said displaceable means and no change in said communicated measurement.

14. A differential pressure detector comprises:

first and second pressure sensors;

first and second pressure chambers which substantially surround respective said first and second sensors;

a hollow tube connecting said first and second pressure sensors;

a displaceable means having a displacement depending on the difference in pressures in said first and second pressure chambers;

means for measuring the displacement of said displaceable means and communicating a resulting measurement; and an incompressible fluid occupying first and second separate identical sealed volumes defined by respective first and second pressure sensors, respective portions of said tube, and a central volume of magnetic fluid;

wherein said magnetic fluid separates said first and second identical sealed volumes and suspends said displaceable means.

15. A differential pressure detector according to claim 14, wherein each of said first and second pressure sensors comprises one or more pairs of diaphragms, each of said pairs comprising an inner diaphragm and an outer diaphragm sealed together at respective diaphragm peripheries, wherein both said inner and outer diaphragms are flexible, and wherein liquid or gas in said first and second pressure chambers contact both said inner and outer diaphragms.

16. A differential pressure detector according to claim 15, wherein said inner and outer diaphragms' mutually opposing faces mate perfectly when pressed together in an overpressure condition, and sustain no damage when pressed together with a pressure thousands of times greater than the pressure needed to reach said overpressure condition, thereby allowing the measurement communicated during said overpressure condition to be accurately repeatable during all occurrences of said overpressure condition.

17. A differential pressure detector according to claim 14, wherein said first and second pressure sensors have predetermined compliances so that a prepressurization of said incompressible fluid is sufficient to drive any gaseous bubbles into solution.

18. A differential pressure detector according to claim 14, wherein said differential pressure detector is symmetric about a mid-point of said tube so that thermal expansion of said incompressible fluid causes no displacement of said displaceable means and no change in said communicated measurement.

19. A differential pressure detector according to claim 14, wherein said displaceable means comprises a permanent magnet having north and south ends which are attached to respective north and south soft iron end caps.

* * * * *